Dec. 1, 1970  R. M. PUTNAM  3,544,221
QUARTZ MODULATED MIRROR SMALL ANGLE DETECTION DEVICE
Filed Oct. 9, 1967  3 Sheets-Sheet 2

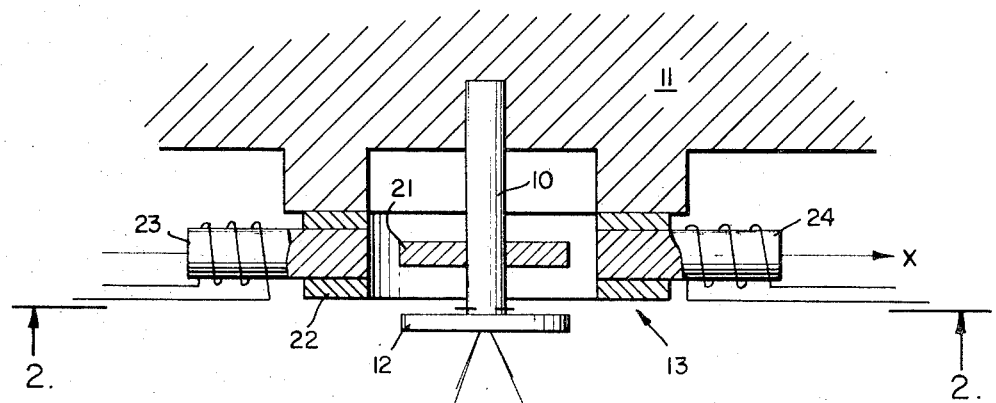
Fig. 1.
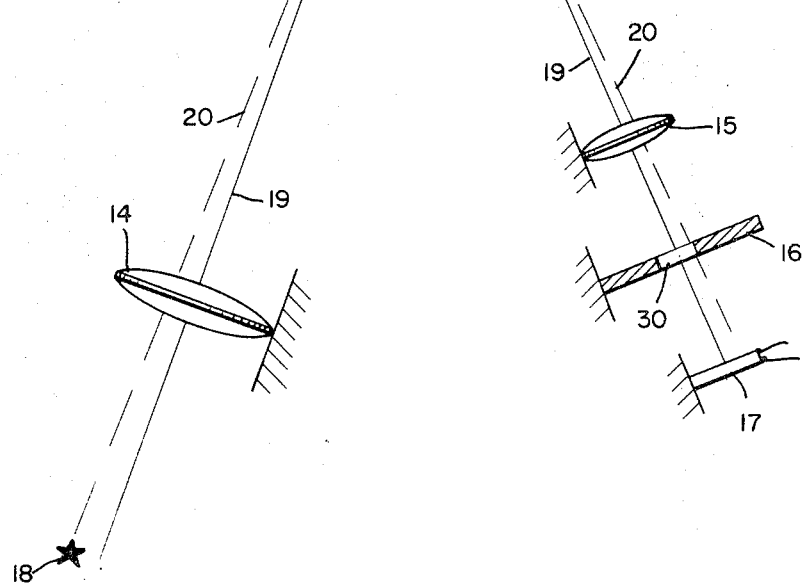

Robert M. Putnam,
INVENTOR.
BY
Edward Dugas
AGENT.

Dec. 1, 1970  R. M. PUTNAM  3,544,221
QUARTZ MODULATED MIRROR SMALL ANGLE DETECTION DEVICE
Filed Oct. 9, 1967  3 Sheets-Sheet 3

Robert M. Putnam,
INVENTOR.

United States Patent Office 3,544,221
Patented Dec. 1, 1970

3,544,221
QUARTZ MODULATED MIRROR SMALL ANGLE DETECTION DEVICE
Robert M. Putnam, Manhattan Beach, Calif., assignor to TRW Inc., Redondo Beach, Calif., a corporation of Ohio
Filed Oct. 9, 1967, Ser. No. 673,813
Int. Cl. G01b 11/26
U.S. Cl. 356—152          8 Claims

ABSTRACT OF THE DISCLOSURE

A mirror is affixed to one end of a quartz rod and the rod is mounted at the other end in cantilevered fashion to a reference frame. An electromagnetic driver is connected between the reference frame and the quartz rod to impart a nutating motion to the quartz rod and the mirror. An objective lens collects the light from a desired image and directs the light along an image axis to the mirror's surface. A collector lens is rigidly attached to the reference frame and is positioned in front of the mirror to receive the reflected image along a sensor axis. The collector lens focuses the light rays from the mirror onto a photodetector element. A diaphragm having an aperture is positioned at the focal point of the collector lens and between the collector lens and the photodetector element. The position of the image with respect to the aperture as compared to the position of the nutating mirror is a function of the angle between the image axis and the sensor axis.

BACKGROUND OF THE INVENTION

This invention pertains to the field of optical angle detecting devices and, more particularly, the invention is concerned with the determination of the angle between a sensor axis (reference axis) and the axis of a desired image. Various types of optical angle determination devices exist in the prior art. One such device is disclosed in U.S. Pat. 2,981,843 entitled "Star-Tracking System" by S. Hansen. In that patent, the particular objective to be accomplished is the determination of the position of a star with respect to a reference frame. This is accomplished by having a telescopic lens system which is pointed toward the selected star with the field image produced by the telescope being projected against a diaphragm having an aperture pattern. Before the field image is sent through the aperture pattern, it is first sent to a mirror which is mounted slightly off-axis on a rotating shaft so that as the shaft is rotated by a motor, the mirror reflects the star image in a cone path. A diaphragm having openings projecting radially from the center thereof is positioned in the cone path so as to interrupt the light in a predetermined manner when the cone is slightly off center. A photodetector is placed behind the diaphragm to receive the light pulses formed when the star image is interrupted. The output of the photodetector is a frequency-modulated signal which contains enough information to determine the pointing error of the sighting telescope.

Another prior art device is disclosed in U.S. Pat. No. 2,997,588 entitled "Target Tracking System" by D. D. Wilcox, Jr. In that patent, a target is brought within the field of view of a sighting telescope and the image received by the telescope is then directed to a mirror which is mounted slightly off-axis on a rotating shaft so as to impart a nutation to the target's image. The reflected image from the mirror then sweeps out a cone which is directed to a photodetector element formed in the shape of a cross and which provides direction and amplitude information proportional to the position of the cone center on the photodetector.

In each of the aforementioned patents, the critical operating element is the nutating mirror. The mirror is driven by a motor at a substantially constant rate of speed. This is a highly inefficient way of achieving mirror nutation because of the large amount of power consumed in driving the motors and because it is also somewhat inaccurate in that the frequency at which the mirror is nutated is not strictly controlled due to the varying speeds that are normally encountered with motors. Mechanical drives are also temperature-sensitive and lack long-term stability.

The device of this invention is directed to an improved apparatus which utilizes a nutating mirror that is driven by a mechanically resonating quartz rod. The device determines the angle between the desired image and a reference frame and has excellent long term stability, low power requirements, is insensitive to temperature variations, and has a high speed of response.

SUMMARY OF THE INVENTION

In one embodiment of this invention, an elongated quartz rod is mounted in a cantilevered fashion from a reference frame. A mirror is mounted to the free end of the rod. A magnetic material is symmetrically affixed to the quartz rod. Field coils are symmetrically positioned around the magnetic material for driving the quartz rod at or near its resonant frequency in a circular path. Objective lens means are affixed to the reference frame along an optical axis to direct an image to the mirror surface. A diaphragm is positioned with respect to the mirror to receive the reflected rays therefrom and to limit the passage of rays through the diaphragm to a predetermined area. A photodetector means is positioned to receive the light which passes through the defined opening in the diaphragm. Circuit means are provided for receiving the output signal from the photodetector and for providing an output signal indicative of the position of the reference frame with respect to a desired image axis.

Accordingly, it is an object of the present invention to provide a novel apparatus for nutating a mirror.

It is a further object of the present invention to provide an apparatus for accurately determining small angle deviations between a reference line and an image axis.

It is a further object of the present invention to provide an apparatus for nutating a mirror in a substantially circular path.

The aforementioned and other objects of the present invention will become more apparent and better understood when taken in conjunction with the following description and drawings, throughout which like characters indicate like parts, and which drawings form a part of this application.

FIG. 1 is a diagrammatic detailed view of one form of the invention, illustrating the operating principles thereof;

BRIEF DESCRIPTION OF THE PREFERRED EMBODIMENT

Figure 2:
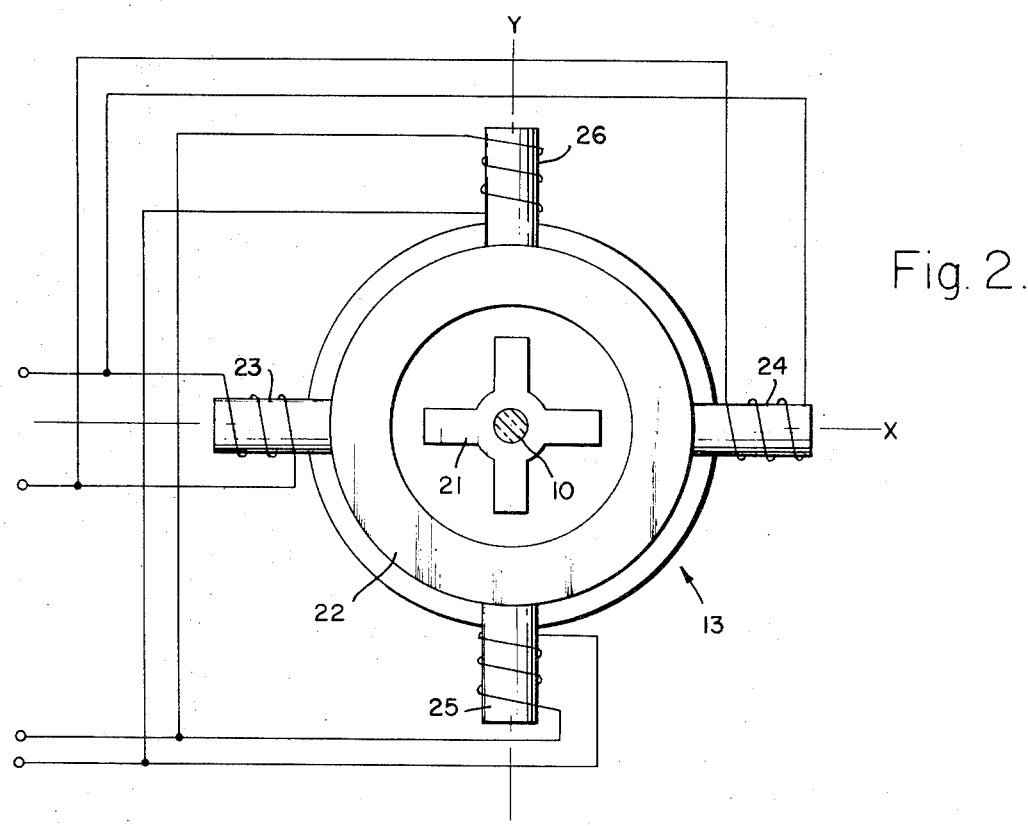
FIG. 2 is a sectioned view of the embodiment of FIG. 1 taken along the sectioning lines 2—2.

Referring to FIGS. 1 and 2, the elongated quartz rod 10 is fixedly attached to a reference frame 11 in a cantilevered fashion. A mirror 12 is mounted with its reflective surface perpendicular to the longitudinal axis of the rod 10. An electromagnetic deflection means 13 is symmetrically positioned around the rod 10 to impart a circular motion thereto. The electromagnetic deflection means 13 is comprised of a soft iron armature core 21, which is fixedly attached around a portion of the quartz rod 10, a soft iron toroid shaped element which is symmetrically positioned about the armature 21, and fixedly attached to the reference frame 11 along with electromagnetic pole pieces 23 and 24 for imparting a motion along the y-axis. When activated in combination by an oscillator (shown in FIG. 4), the four pole pieces will impart a circular motion to the quartz rod 10. An objective lens 14 which is fixedly attached to the reference frame directs light along an optic reference axis 19 to the surface of the mirror 12. The reflected light from the mirror is passed through a collector lens 15 which is attached to the reference frame and from there the received light passes along the optic axis to a diaphragm 16 having an apertured opening 30 therein to a photodetector means 17. The apertured opening 30 is smaller in diameter than the sensitive surface of photodetector means 17. The condensing lens 15 is positioned so an image within the field of view of the objective lens 14 is focused at the aperture 30.

An image 18, displaced slightly from the reference axis 19, projects rays of light along an image axis 20 to the mirror 12 and then to the photodetector 17.

Figure 3:
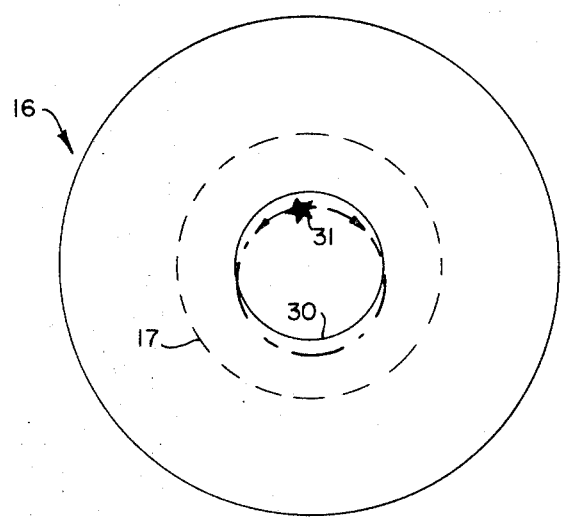
FIG. 3 is an enlarged view of an apertured diaphgram utilized in the present invention.

FIG. 3 shows one particular configuration for the diaphragm 16 and the aperture 30. The diaphragm is circular with the apertured opening being centrally placed thereon and being circular in shape. Various shapes for the diaphragm and the apertured opening may be used without departing from the scope of the invention. The reflected image 31 of the sighted image 18 is shown tracing out a circular path, the center of which is displaced slightly from the center of the aperture 30. When the image axis 20 is aligned with the image axis 19, the reflected image 31 will trace a symmetrical path within the aperture 30. The output from the photodetector 17 will be a fixed order phase-sensitive signal when a displacement occurs between the two axes, such as is indicated in FIG. 3. When the image 31 traces a symmetrical path on the photodetector a signal having second harmonic of the frequency used to drive the rod will be generated by the photodetector. These signals may be demodulated to give amplitude (the distance between the centers of the aperture and the trace path) and direction information (the direction which the traced center has with respect to the aperture center).

Figure 4:
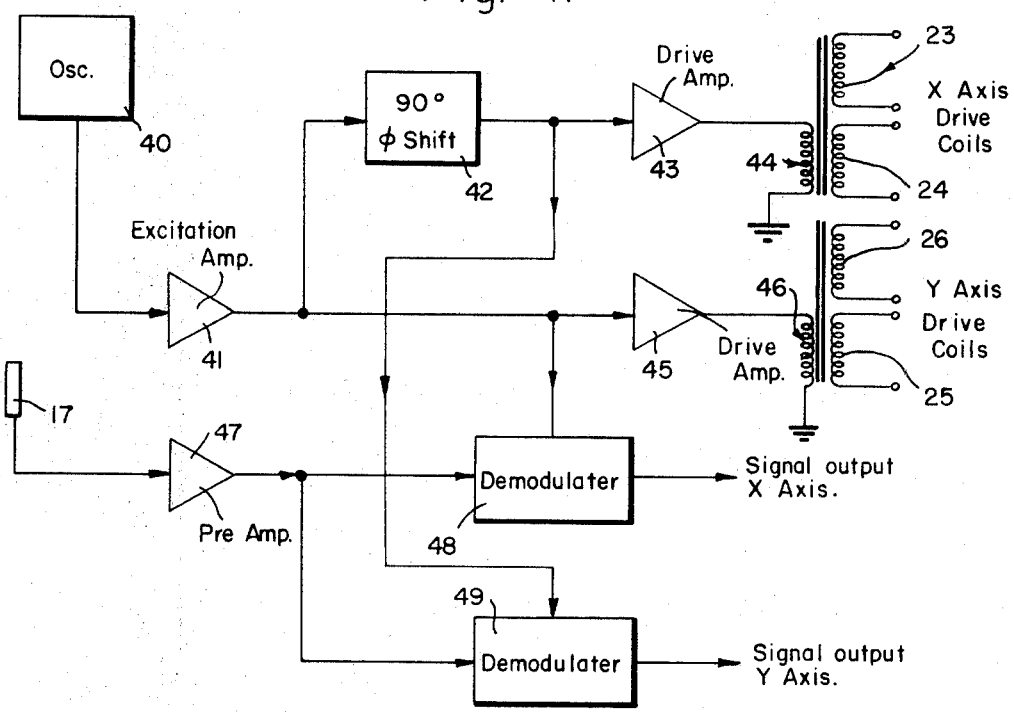
FIG. 4 is a block diagram of a circuit for obtaining and utilizing signals from the device of FIG. 1.

Referring now to FIG. 4, an oscillator 40 having an output frequency corresponding to one of the resonant nodes of the quartz rod 10 has its output amplified by an excitation amplifier 41. The output of the excitation amplifier is fed to a drive amplifier 45 and from there to the y-axis drive coils 25 and 26 via a driving transformer 46. The output of the excitation amplifier 41 is also fed to a 90° phase shifter 42 and from there to a drive amplifier 43 and in turn to the x-axis drive coils 23 and 24 via a driving transformer 44. The output of the photodetector means 17 is fed to a preamplifier 47 and from there to an x-axis demodulator 48 into which a reference signal from the excitation amplifier 41 is also fed to provide an output signal containing x-axis information. The output of the preamplifier 47 is also fed to a y-axis demodulator 49 into which a reference signal from the output of the 90° phase shifter 42 is also fed to provide an output signal containing y-axis information. The outputs from the demodulators 48 and 49 may be utilized to give position information and may also be fed back to servo motors (not shown) connected to the reference frame 11 to reposition the reference frame with respect to the image 18 so as to align the reference axis 19 with the image axis 20. Such a configuration would have an application in devices such as star trackers.

Figure 5:
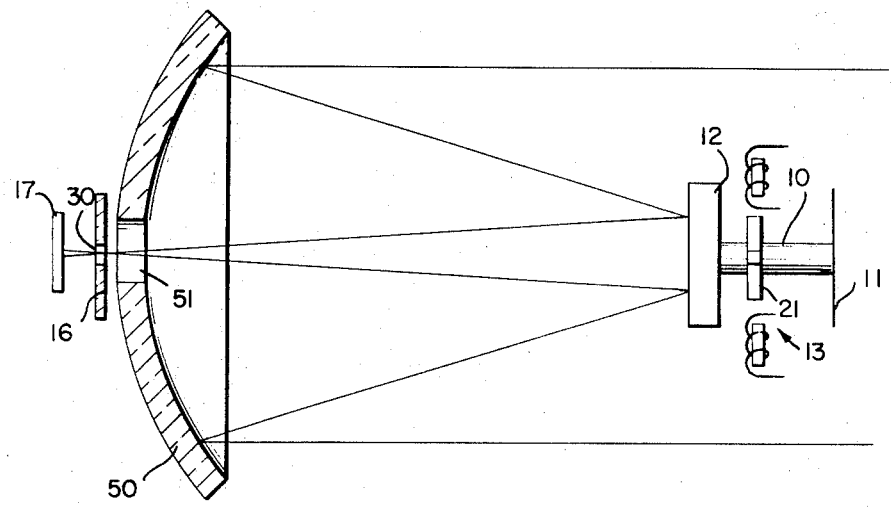
FIG. 5 is a diagrammatic detailed view of a second embodiment of the invention illustrating the operating principles thereof.

FIG. 5 is a second embodiment of the invention wherein the mirror nutating system is the same as that used in FIG. 1, with the reference axis 19 being coincident with the longitudinal axis of the quartz rod 10 in the unenergized (non-vibrating) position, and wherein a collector mirror 50, having a parabolic shape is used to collect rays from an image along an image axis and to direct the collected rays to the reflective surface of the mirror 12. The reflected rays from the mirror are focused in the apertured opening 30 of the diaphragm 16 after passing through the opening 51 in the collector mirror 50. The image rays pass through the apertured opening 30 onto the photodetector element 17. The output of the photodetector is then connected to the input of the preamplifier 47 of the circuit of FIG. 4 to provide an indication of the position of the image axis with respect to the reference axis 19. The collector mirror 50, photodetector 17, light stop 16 and the quartz rod 10 are all fixed with respect to the reference frame 11. The detection of the angular position of the image axis with respect to the reference axis is similar to the detection process previously described in connection with the embodiment of FIG. 1. The embodiment of FIG. 5 utilizes a folded telescope system for light focusing. This system is commonly referred to as the Cassegrainian system.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as fall within the true scope of the invention.

What is claimed is:
1. An angle detector comprising:
   a reference frame;
   a quartz rod cantilevered from said reference frame;
   a mirror mounted on the free end of said quartz rod;
   means gathering image rays from an object and directing them toward said mirror;
   means focusing the rays reflected from said mirror;
   a photodetector receiving the focused rays and producing an output when said rays are received;
   electromagnetic drive means nutating the quartz rod and mirror; and
   means for determining the position of said mirror when said photodetector produces an output; so that
   the angle of said object from said reference frame can be determined.

2. An angle detector as claimed in claim 1 wherein the electromagnetic drive means nutates said quartz rod at the mechanical resonant frequency of said quartz rod.

3. An angle detector is claimed in claim 1 wherein the electromagnetic drive means comprises:
   a ferromagnetic member symmetrically affixed around the longitudinal axis of said quartz rod;
   a plurality of magnetic pole pieces symmetrically disposed around said ferromagnetic material and affixed to said reference frame; and
   means for alternately exciting said pole pieces to nutate said quartz rod.

4. An angle detector as claimed in claimed 3 wherein said ferromagnetic member consists of soft iron.

5. An angle detector for detecting small changes in position of a light emitting object comprising:
   a fixed reference frame;
   a quartz rod cantilevered from said reference frame;
   a mirror mounted on the free end of said quartz rod;
   a first lens focusing the object onto said mirror;
   a photodetector;
   a second lens receiving the light reflected from said mirror and focusing it onto said photodetector;
   means for nutating said quartz rod and mirror; and
   means for determining the position of said mirror whenever said phototdetector produces an output.

6. An angle detector as claimed in claim 5 wherein the electromagnetic drive means comprises:
- a ferromagnetic member symmetrically affixed around the longitudinal axis of said quartz rod;
- a plurality of magnetic pole pieces symmetrically disposed around said ferromagnetic material and affixed to said reference frame; and
- means for alternately exciting said pole pieces to nutate said quartz rod.

7. An angle detector as claimed in claim 6 wherein the ferromagnetic member consists of soft iron.

8. An angle detector as claimed in claim 5 wherein the electromagnetic drive means nutates said quartz rod at the mechanical resonant frequency of said quartz rod.

References Cited
UNITED STATES PATENTS

| | | | |
|---|---|---|---|
| 3,054,323 | 9/1962 | Davidson | 356—152 |
| 3,336,832 | 8/1967 | Snavely | 356—152 |
| 3,356,848 | 12/1967 | Heyck | 356—152 XR |
| 3,386,786 | 6/1968 | Kaisler et al. | 350—6 |
| 3,438,712 | 4/1969 | Meltzer | 356—141 XR |

RODNEY D. BENNETT, Primary Examiner

J. G. BAXTER, Assistant Examiner

U.S. Cl. X.R.

350—6, 7; 356—141